No. 818,320. PATENTED APR. 17, 1906.
J. N. WEIKLY.
FLUID PRESSURE BRAKE AND OTHER APPARATUS.
APPLICATION FILED DEC. 10, 1896. RENEWED OCT. 19, 1905.
3 SHEETS—SHEET 1.
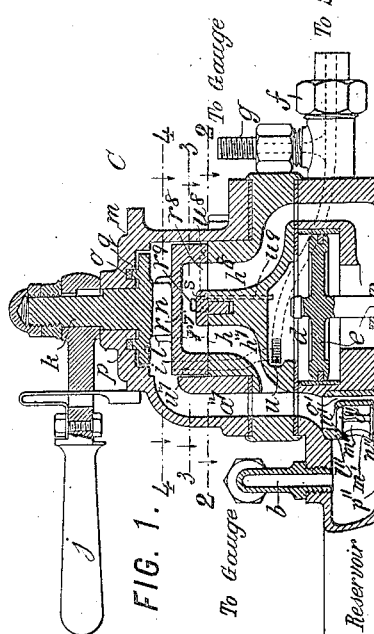
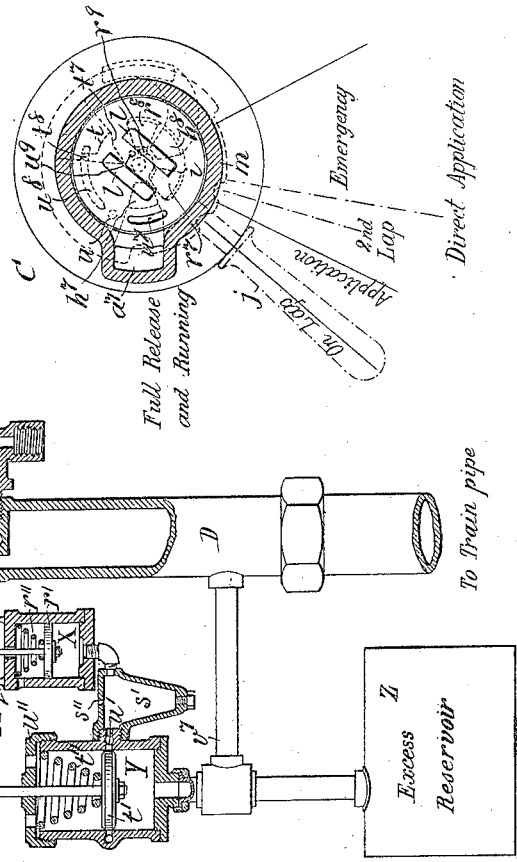
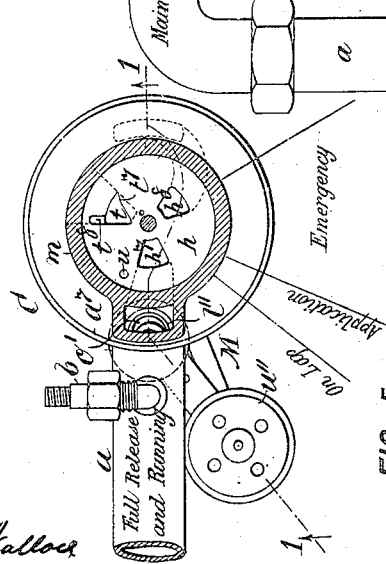
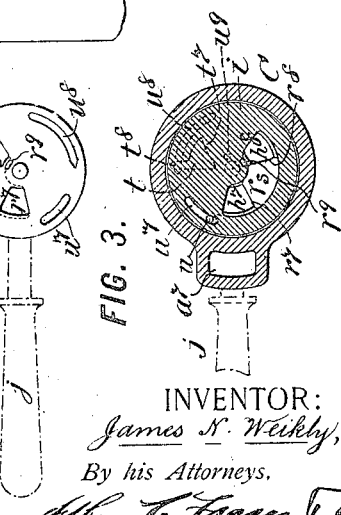
WITNESSES.
Fred White
Thomas F. Hallock
INVENTOR:
James N. Weikly,
By his Attorneys.

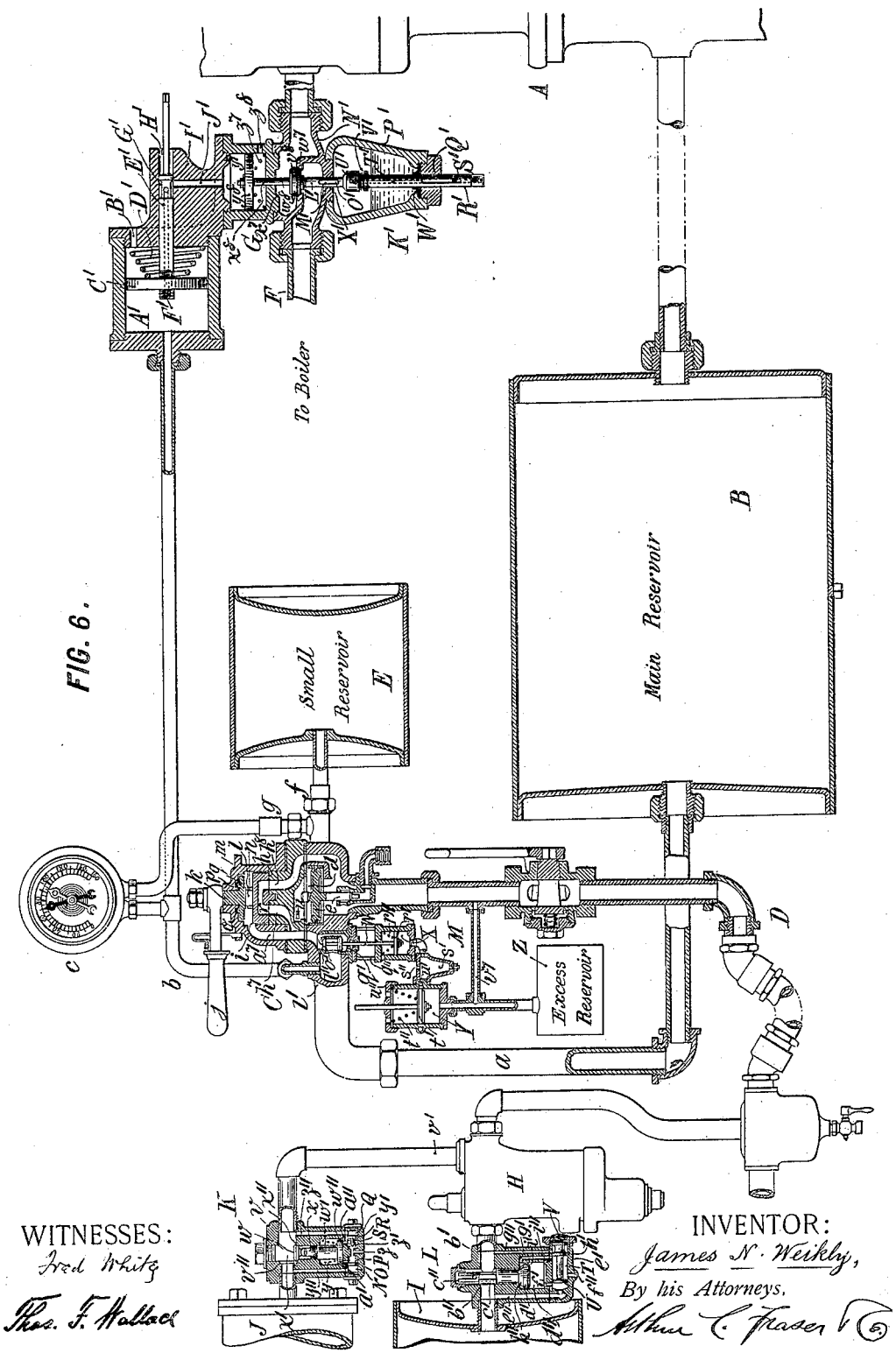

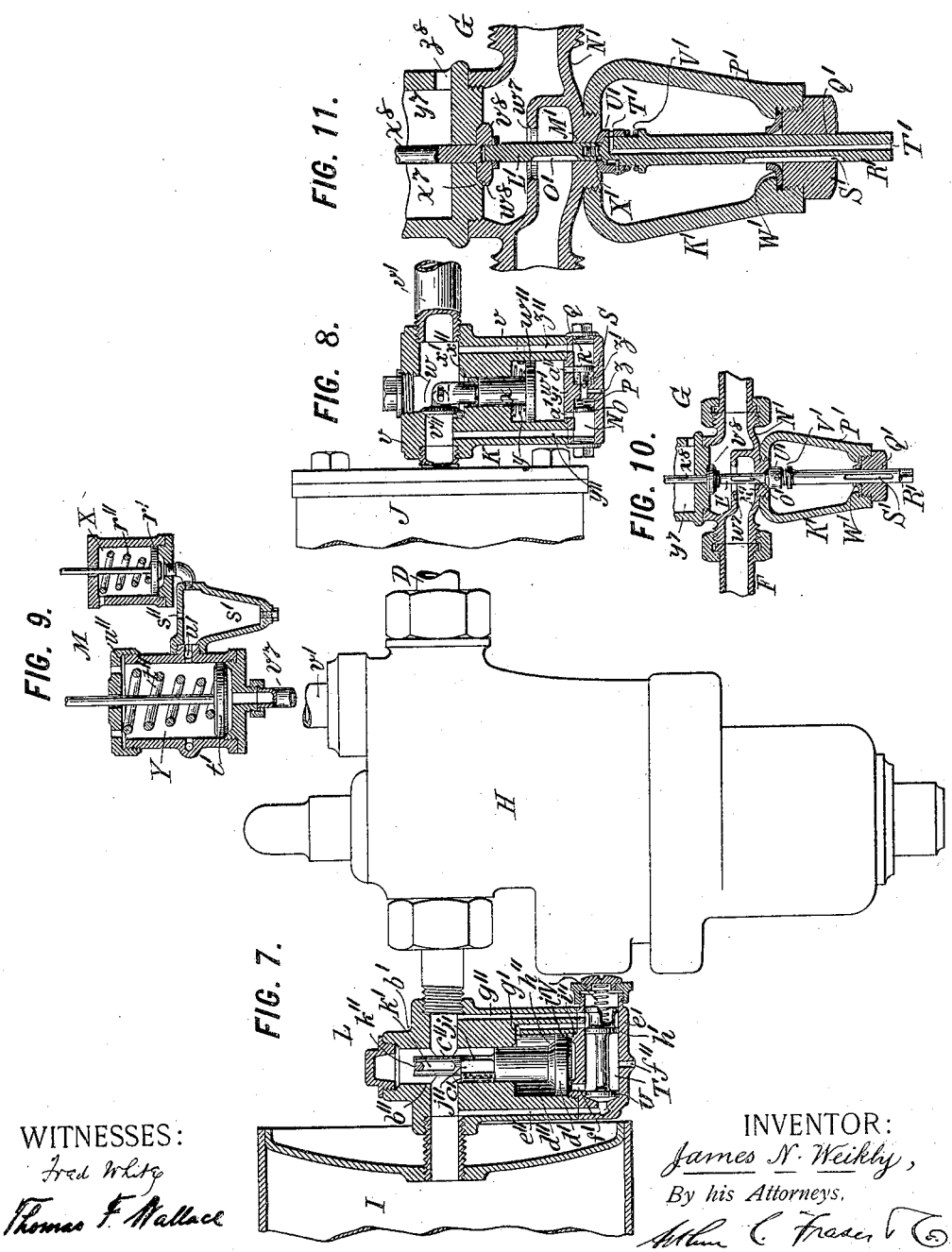

UNITED STATES PATENT OFFICE.

JAMES N. WEIKLY, OF JERSEY CITY, NEW JERSEY, ASSIGNOR TO GEORGE HOLT FRASER, OF BROOKLYN, NEW YORK.

FLUID-PRESSURE BRAKE AND OTHER APPARATUS.

No. 818,320.            Specification of Letters Patent.            Patented April 17, 1906.

Application filed December 10, 1896. Renewed October 19, 1905. Serial No. 283,500.

*To all whom it may concern:*

Be it known that I, JAMES N. WEIKLY, a citizen of the United States, residing in Jersey City, in the county of Hudson and State of New Jersey, have invented certain new and useful Improvements in Fluid-Pressure Brakes and other Apparatus, of which the following is a specification.

This invention relates especially to fluid-pressure brakes, such as air-brakes, and aims to provide certain improvements applicable to such apparatus, which will be hereinafter set forth.

In air-brakes as used in connection with railway-trains it is customary to employ a brake system adjusted to give the maximum braking power at a pressure of seventy pounds per square inch, the leverage being such that when this pressure is exceeded there is danger of sliding the car-wheels, which is to be avoided, because the wheels are thereby flattened and rendered imperfect. To insure a sufficient supply of air in the main reservoir for quickly releasing the brakes and replenishing the exhaust, it is common to adjust the governor of the air-pump to operate at a pressure of ninety pounds or more, and to prevent this excess pressure from entering the train-pipe brake-valves are now constructed with an excess-pressure valve, the engineer's valve being adapted to be moved from the full-release position, at which there is free communication between the main reservoir and the train-pipe, to a running position at which communication is established between the main reservoir and the excess-valve, which latter permits a contracted flow into the train-pipe valve so long as the difference in pressure exceeds the predetermined limit, usually twenty pounds. The excess-valve is held against opening by a spring and the train-pipe pressure at rear of it, the force of the spring usually being twenty pounds, and is opened by the main-reservoir pressure whenever the latter exceeds its resistance and then permits a reduced flow of pressure to the train-pipe valve to make up for leakage and preserve a pressure of seventy pounds therein during running. The engineer's valve usually has five positions: first, the full release, at which the main reservoir and train-pipe ports are in free communication; second, the running position, at which communication to the train-pipe exists only through the excess-valve, the port of which is then open to the main reservoir; third, the lap position, at which all ports are closed; fourth, the application position, at which the equalizing discharge-valve is used for service application, and, fifth, the emergency position, at which the train-pipe and direct exhaust-ports are in communication to quickly and completely apply the brakes. The emergency position is only employed in extreme cases. The release position is that to which the valve is always moved after an application. The running position is that to which the valve should be carried immediately after release to prevent a rise of pressure in the train-pipe above the seventy-pound limit.

In use it is found that there is great liability that the engineer will leave his valve habitually in the full-release position, thereby raising his train-pipe pressure to main-reservoir pressure and endangering sliding of the wheels. This may result either from inattention to the desirability for shifting the valve immediately after release or to a feeling of greater confidence in the knowledge that all available pressure is ready for instantaneous use. The result is an undue straining of the braking system and frequent sliding of the wheels, so that the best braking adhesion is not obtained and the wheels slid are quickly flattened, causing great expense for their removal and truing.

My present invention aims to avoid this disadvantage and to simplify and improve the engineer's valve and the brake system and lessen the number of positions of the valve. To this end in carrying out the preferred form of my invention I provide means automatically controlling the maximum of pressure in the train-pipe, and I provide certain other features of improvement, all of which will be hereinafter more fully set forth.

In the accompanying drawings, Figure 1 is a side elevation, partly in section, on the line 1 1 of Fig. 2 of an engineer's brake and equalizing-valve and its connections, showing one and the preferred form of my improvements as applied thereto. Fig. 2 is a fragmentary plan thereof, partly in horizontal section, on the plane of the valve-seat, as shown by the line 2 2 in Fig. 1. Fig. 3 is a fragmentary horizontal section thereof cut through the main port of the valve when in the full-release and running position, as shown by the line 3 3 in Fig. 1. Fig. 4 is a fragmentary horizontal section thereof cut on the line 4 4 in Fig. 1, showing the valve in plan and in the on-lap position. Fig. 5 is a view of the bottom face of the valve; and Fig. 6 is an elevation, partly in vertical section, showing the valves, pipes, reservoirs, and pump-governor as arranged and equipped according to the preferred form of my invention. Fig. 7 is a fragmentary axial section of the excess-valve for the auxiliary reservoir shown in the open position on a larger scale. Fig. 8 is a like view of the brake-cylinder excess-valve in the closed position. Fig. 9 is a like view of the main excess-valve in open position. Fig. 10 is a like view of the drain-valve in one position; and Fig. 11 is an enlarged view thereof in another position, showing the stem in section looking at right angles to the point of view for Fig. 10.

In the drawings I have illustrated my improvements as applied to the Westinghouse automatic brake, having an equalizing-discharge valve for the engineer's valve and a triple valve between the auxiliary reservoir and the brake-cylinder, in connection with which class of apparatus I will now describe in detail the preferred form and arrangement of my improvements, although it will be understood that the improvements are not limited in their application to this particular character of apparatus, nor to the particular details of construction, arrangement, and combination shown in connection therewith.

Referring to the drawings, let A represent the air-pump of a brake system; B, the main reservoir thereof; C, the engineer's valve as a whole; D, the train-pipe; E, the small reservoir; F, the steam-pipe to the pump; G, the governor-valve therein; H, the triple valve on a car; I, the auxiliary reservoir thereon, and J the brake-cylinder. These parts may be of any usual or suitable construction. In the arrangement shown the pipe F supplies steam to the steam end of the pump A, the valve G cutting off this supply when the air-pressure in the main reservoir reaches a predetermined limit—usually ninety pounds to the square inch. The pipe $a$ supplies air from the main reservoir to the valve C, through which this air passes to the train-pipe D, which feeds it through the triple valves to the auxiliary reservoirs, from which it passes to the brake-cylinder for use, as usual. A pipe $b$ leads from the pipe $a$ to the gage $c$ and the pump-governor G, the light or white finger of the gage indicating main-reservoir pressure, which is utilized to operate the pump-governor to cut off its steam-feed at the proper pressure. The engineer's valve has the usual equalizing-cylinder $d$, carrying the equalizing-discharge-valve piston $e$ for effecting gradual exhaust for service applications. The pipe $f$ leads from above the piston $e$ to the small reservoir and has a branch $g$ leading to the gage $c$ and indicating by the dark or black hand thereof the pressure in the small reservoir, which of course is normally the same as that in the train-pipe. The engineer's valve comprises a flat seat $h$, on which seats a disk valve $i$, oscillated by a handle $j$ to throw it to the several positions requisite to the operation of the system.

My invention provides certain improvements in the construction of the engineer's valve itself, which I will first describe in detail.

One feature of improvement consists in the connection between the disk valve $i$ and the rod $k$ of its handle, whereby this rod can tilt axially to the extent of any freedom there may be in its fit in the hood $m$ of the valve-casing to yield under the pressure of the hand on the handle $j$ in direction parallel with the longitudinal axis of this handle without tending to cant or move the disk valve. The practice of constantly holding and leaning on this handle is found to unevenly wear the face of the disk valve, which wear soon affects its working. I provide a connection, consisting of interengaging shoulders $l\ n$, on the stem and disk valve, locking the parts rotatively together, extending parallel with the axis of the handle and shaped or constructed, as by curving their top and bottom faces or giving a loose fit, to render any canting of the stem ineffective as against the disk valve while locking the latter and stem to rotate together. Another feature of improvement relates to the packing between the stem and hood, which I construct as an annular ring $o$, seated in and of less depth than an annular groove $p$ in one of the parts and compressed therein by an annular rib $q$ in the other of the parts, so that all the outward pressure against the stem is exerted against this confined packing-ring to make a leak-tight joint at a point preferably remote from the bearing portion of the stem where is passes through the hood. According to another feature of improvement, I make the port through the valve communicating between the main reservoir and train-pipe as an internal port having a bottom wall between its port-openings which is flush with and seats against the seat $h$, and thereby avoids leaving the top of this seat exposed as a possible lodging-place for grit while the valve is in position affording communication between the reservoir and train-pipe. I also construct the port $r$ with openings $r^7\ r^8$ on its under face and construct the seat $h$ with a reservoir-port $h^7$, leading from the main reservoir to an opening beneath the valve, and with a train-pipe port $h^8$, opening beneath the valve and leading to the train-pipe, these ports being of like size and location to the openings $r^7\ r^8$ of the disk valve and all having radial side edges, so that both ports are simultaneously opened and closed. I also provide a full-exhaust port $t$, leading from the seat $h$ to the outer air for emergency applications, which is substantially similar in shape and location to the other ports, except that it has a graduated outlet-opening $t^7$ on its side adjacent to the train-pipe port and an extension $t^8$ on its other side, serving as part of the equalizing exhaust-port, which is combined for convenience with the full-exhaust port to limit the number of ports in the valve. The graduated outlet $t^7$ of the port $t$ is designed to permit a gradual discharge from the train-pipe by partially opening this port in case the equalizing-discharge is not employed.

The ports $h^7$, $h^8$, and $t$ are placed equidistantly at points around the axis of the valve-stem and the same distance apart as are the ports $r^7$ $r^8$ of the valve, so that the bridge-wall $s$ between the latter ports substantially covers the space between the ports opposite which it stands. Thus no grit can be blown onto this face, and thereby a great source of wear to the valve-faces is avoided. The dimensions and spacing of the ports, as well as their number and arrangement, will be determined by the particular character and functions of the valve to be employed. I prefer the simple construction shown, wherein the valve has but four positions—the full-release position, which is also the running position, at which the valve stands with its handle directly to the left in the construction shown and communication is full and free between the train-pipe and reservoir-port, as shown in Fig. 3, the full-discharge port being closed and the equalizing-port $u$ being open through its port $u^7$, which is an arc-shaped port extending through the valve. The second position is the lap position, (shown in Fig. 4,) in which the reservoir and train-pipe ports, as well as the full-release and equalizing ports are all closed, in which position the train-pipe is isolated from the reservoir. In moving to this position the equalizing-port $u^7$ of the valve closes the port $u$ at the same time that the port $r^7$ closes the reservoir-port $h^7$. Between this position and the full-release position there is a considerable movement for application, the application position being indicated by a line in Figs. 2 and 4 and being the position at which the point of the application-duct $u^8$ meets the port $u$ and permits discharge of air from above the piston $e$ to the exterior for an ordinary service application. The duct $u^8$ is shown as an arc-shaped port communicating with the full-exhaust port and has a contracted or tapering end which moves over the equalizing-port $u$ to a greater or less extent, according to whether a rapid or reduced escape from the equalizing chamber is desired. The full release of all the air in the train-pipe is effected by throwing the valve to the emergency position, (indicated in Figs. 2 and 4,) which closes all ports except the train-pipe and full-exhaust ports which it throws into complete communication if the valve is thrown to the extreme of the emergency position. Any intermediate or lesser movement of the valve will give a relatively contracted or more gradual exhaust, which can be controlled by the notch $t^7$.

By placing the ports $h^7$ and $h^8$ both beneath the valve, I also secure a freer movement of the latter. I still insure a sufficient seating of it by employing the usual port $a^7$, leading to the top of the valve, so that the full pressure is exerted over the whole area of the latter to hold it properly seated. This also provides for a constant source of supply through the ports $u^7$ and $u$ to the equalizing-chamber when the valve is in positions requiring such flow.

It will be understood that other ports may be employed for additional purposes in connection with any or all of the features of improvement described in the valve; but I consider those set forth as sufficient to accomplish all that is required of the valve in the system shown.

According to the main feature of my present improvements, I provide means preventing a rise of pressure accessible to the brake-cylinder exceeding the predetermined limit for which the brake mechanism is adjusted, preferably employing an improved automatic pressure-governor for this purpose and making it independent of the engineer's valve in its action. The improved pressure-governor is located between the air-pump and brake-cylinder and controls the pressure in the latter independently of that developed in the former. It may be of any suitable location or construction capable of automatically preventing an excess of pressure in the brake-cylinder and still permitting proper operation of the system; but it is best to adapt the construction of the governor, when but one is used, to the particular portion of the system with which it is used and to adapt the construction of each, when a plurality of governors are used, to the particular requirements of the portion of the system with which each is respectively used. In the construction shown I prefer to employ a plurality of pressure-governors, each of which will be hereinafter termed "excess-valves," one being shown at K for the brake-cylinder, another at L for the auxiliary reservoir, and another at M for the train-pipe. The latter is between the main reservoir and the engineer's valve and controls flow through the pipe $a$, so that beyond itself there cannot at any time be a pressure exceeding the limit desired—say seventy pounds per square inch—for the train-pipe. The excess-valve L when used is between the triple valve H and the reservoir I and prevents flow to the latter of a pressure exceeding seventy pounds per square inch, while the excess-valve K is between the triple valve and the brake-cylinder and isolates the latter at the moment the pressure therein reaches seventy pounds per square inch. The valve K when used will fully protect the brake-levers and prevent sliding of wheels no matter what pressure may exist in the rest of the system, in which the pressure may vary because of a rush of air or by leaving the engineer's valve at the full release position when the other excess-valves are not used or by reason of accident to the other valves rendering them defective.

The valve L when used will protect the auxiliary reservoir against a pressure exceeding seventy pounds, so that so long as it is operative the brake-cylinder will be protected even should the valve K be tampered with and independently of how great a pressure may be thrown into the train-pipe.

The excess-valve M will protect the whole system from a normal pressure exceeding seventy pounds, so that no part of the system can be subjected to a greater pressure than this, except such a temporary pressure as may result from a rapid rush of air in the train-pipe, this protection continuing independently of the position of the engineer's valve so long as the excess-valve M is not tampered with or impaired.

The excess-valves are operated by the pressure within the part they protect, being closed by this pressure and opened by any suitable means. Each is constructed as a quick-action valve designed to instantaneously pop to and from the open position and is graduated to operate with a nicety at the pressure desired. The form of the valve K is best suited for its location. In construction it consists of a casing $v$, screwed into the pipe $v'$, leading from the triple valve, which casing has a seat $v''$, against which acts a valve $w$, which when seated isolates the cylinder and when open establishes full communication between the latter and the pipe $v'$. The casing $v$ has a cylinder $w'$, in which works a piston $w''$, which has a stem $x$ loosely coupled to the valve $w$ within the tubular chamber $x'$ of the casing, which stem works through a tubular passage between this chamber and the cylinder $w'$. The piston is forced toward the open position either by the pressure in the chamber $x'$ or by a spring $y$ in the cylinder and when in this position holds the valve open and resting on the top of the neck $x''$, as shown in Fig. 6. The lower end of the cylinder $w'$ is closed by a cap or wall $y'$, which has a cylinder N, in which fits a piston O, resisted by a graduated spring P, which cylinder is in communication with the brake-cylinder through a duct $y''$, traversing the casing and cap, which duct supplies brake-cylinder pressure to the side of the piston O opposite that against which the spring P reacts. A port $a'$ leads from the cylinder N to the cylinder $w'$ and permits pressure to flow to the latter when the piston O opens this port, as by passing it. A port $z$ communicates with the air behind the piston O. The spring P is adjusted to hold the piston in advance of the port $a'$ and against opening of the latter up to a pressure of seventy pounds, at which pressure the piston moves far enough to open the port and permit brake-cylinder pressure to enter the cylinder $w'$, where it will immediately raise the piston $w''$ and at once seat the valve $w$, thus cutting off further feed to the brake-cylinder so long as the pressure therein is high enough to keep the piston O beyond the port $a'$, as shown in Fig. 8. As soon as this pressure falls sufficiently for the spring P to move the piston O to the other side of the port $a'$ the air in the cylinder $w'$ can flow out through this port behind the piston O and escape through the air-vent $z$, thus permitting the piston $w''$ to immediately fall under the tension of the spring $y$ or the pressure on its rod $x$, or both, throwing the valve $w$ to the open position instantaneously. In this manner the position of this valve is controlled by the pressure in the brake-cylinder, so that it must close as soon as this pressure reaches seventy pounds. At this point in the system it is necessary that whenever the pressure in the pipe $v'$, leading to the brake-cylinder, is below seventy pounds the valve $w$ must open, so that a release or reduction of the brake-pressure can be effected. To accomplish this, I also control this excess-valve with the pressure in this pipe, preferably by providing the cap $y'$ with a second cylinder Q, in which is a piston R, resisted by a spring S and carrying an air-valve $z'$, which cylinder is fed from the pipe $v'$ by a duct $z''$ and communicates with the cylinder $w'$ through a port $a''$. The spring S is graduated in the construction shown to allow the piston R to move until its valve $z'$ is seated when the pressure of air in the pipe $v'$ is at seventy pounds, whereupon escape of air through the port $a''$ is prevented; but should this pressure fall below seventy pounds the spring will unseat this valve and permit all the air in the cylinder $w'$ to escape, thus permitting the valve $w$ to open, even if the valve-piston O is in the open position by reason of a seventy-pound pressure in the brake-cylinder. Thus it is assured that the excess-valve will automatically close and open according to the fluctuations of pressure at its opposite sides, so that the pressure in the brake-cylinder can never exceed the seventy-pound limit and its exhaust can be readily effected or graduated.

The excess-valve L for the auxiliary reservoir consists of a casing $b'$, having a valve-seat $b''$, controlled by a valve $c'$, loosely coupled to the stem $c''$ of a piston $d'$, working in a cylinder $d''$ in the casing, which cylinder is closed by a cap $e'$, having a cylinder T, in which is a movable piston, having a head U and resisted by a spring V. A duct $e''$ leads from the reservoir side of the valve to the adjacent side of the piston U and presses the latter against the spring V, the spring being adjusted to permit the piston to open a duct $f'$, communicating between the cylinder T and the cylinder $d''$, when a pressure of seventy pounds exists in the reservoir, thus permitting this pressure to lift the piston $d'$ and close the valve $c'$. When the pressure falls below the limit, the spring moves the piston U to the other side of the port $f'$, whereupon the air can escape through this port and an air-vent $f''$ to the outer air. To insure the falling of the piston $d'$, I provide its cylinder with a port $g'$ above the piston, which port leads to the cylinder T and is in communication with the vent simultaneously with the opening of the port $f'$, so that when there is pressure beneath the piston there is only atmospheric pressure above it, and I provide a duct $g''$, leading from the train-pipe to the cylinder T, and a valve $h'$ in this cylinder, which valve closes the port $g'$ against train-pipe pressure the instant the piston U opens the port $f'$ and keeps it closed against such pressure and open to the atmosphere through the vent $f''$ until the reservoir-pressure falls below seventy pounds, when the spring V throws the piston across the port $f'$ until the latter is open. At the instant of opening the port $f'$ the pressure under it escapes to the vent $f''$, and the valve $h'$ simultaneously opens communication between the train-pipe pressure and the port $g'$, so that this pressure can at once enter above the piston $d'$ and quickly force the latter down should the pressure on the top of its neck $c''$ be insufficient for this purpose. The piston $d'$ has a seat $h''$ at top, making leak-tight engagement with the casing when the piston is up, and a similar seat $i'$ at bottom, making like engagement with a seat $i''$ when the piston is down. The stem of the piston $d'$ is flattened at $j'$ and loosely passes between two wings $j''$ of the valve $c'$, so that this valve is guided and lifted by the piston, but is free to move toward and from its seat, so that it can always unseat when the pressure in the reservoir I exceeds that in the triple valve H, but will immediately seat when the reverse is the case, provided it is opposite its valve-seat. To prevent turning of the piston $d'$, its upper end has a notch $k'$, surrounding a pin $k''$, fixed in the casing. In this manner the reservoir-valve L is automatically closed by the reservoir-pressure, automatically opened by the train-pipe pressure, and is free to open itself toward the triple valve when necessary.

The valve M is best arranged immediately in advance of the engineer's valve, preferably being applied to the casing $l'$ thereof, and is best constructed of a plug $l''$, screwing into and crossing the duct $a^7$, so that communication only exists to the latter through this plug, which plug has an inlet from the pipe $a$ to a cylindrical compartment $m''$, which has seats $n'$ $n''$ above and below the inlet $m'$ and a passage $o'$, leading from the latter seat to the former and thence to the duct $a'$. A valve W, having seats $o''$ at top engaging the seat $n'$, $p'$ engaging the seat $n''$, and $p''$ engaging a seat $q'$, is provided, the stem of which valve passes out through a stuffing-box and a cage $q''$ to a cylinder X, wherein it is fixed to a piston $r'$, resisted by a spring $r''$, which piston at its spring side is open to the atmosphere, while at its other side it is in communication, through a sediment-well $s'$, having a bleed-hole $s''$, with a cylinder Y, in which is a piston $t'$, resisted by a spring $t''$ and movable past ports $u'$, which cylinder Y is open to the atmosphere through an adjustable cap $u''$ at the spring side and communicates at its other side with the train-pipe D by a small pipe $v^7$, which also communicates with an excess-reservoir Z. The spring $t''$ is so adjusted by the cap that when a pressure of seventy pounds exists in the train-pipe, and consequently in the cylinder Y, the piston therein will stand exactly opposite and close the ports $u'$. As soon as this pressure is exceeded the piston opens these ports, and instantly there is a rush of train-pipe pressure into the cylinder X, which at once rises and seats the valve W, thus closing communication between the train-pipe and the main reservoir. This position of the parts continues until the train-pipe pressure falls to or below seventy pounds, whereupon the piston $t'$ moves opposite the ports as a seventy-pound pressure is reached and below the ports as the pressure lowers, permitting immediate escape of the air in cylinder X out above the piston $t'$ and to the outer air through the escape-port in the cap $u''$. To announce the closure of the valve W, the port $s''$ may be used, through which the air will whistle so long as the piston $t'$ is raised above its seventy-pound position. This port also permits a gradual opening of the valve W should the piston $t'$ stand for some moments at its position directly opposite the ports $u'$, whereupon the immediate inflow of reservoir-pressure to the train-pipe will again act to close the valve W. Any suitable reservoir may be employed in conjunction with the excess-valve M to hold some compressed air, so that the pressure fed to this valve will not be entirely subject to sudden fluctuations or rushes of pressure in the train-pipe should this be found desirable in any case.

The cylinder X when separated from the casing $l'$ to a sufficient distance, as shown, leaves room for the location and adjustment of a stuffing-box for the rod of the valve W and also permits the engineer to test the operativeness of this valve by grasping its rod. The valve W is shown as slightly overbalanced, its lower valve $p'$ being of slightly-greater diameter than its upper valve, so that the pressure tends to open it. When fully open, its bottom valve $p''$ by seating on the seat $q'$ will assist in preventing leakage, while its upper valve will stand about opposite the middle of the inlet $m'$, so that its tendency will be to remain open. When the spring $r''$ is used, it can be adjusted to add to this tendency, or it alone can be employed to remove the valve to and retain it in the open position.

For the pump-governor I prefer to employ the improved quick-operating pressure-valve G, which, as shown, comprises a valve $v^8$, closing downward on a seat $w^7$, to cut off flow of steam to the pump, moving upward to permit such flow, having a top valve $w^8$ engaging a seat $x^7$ to prevent leakage when the valve is open, and carried by a stem $x^8$, which passes into a cylinder $y^7$ and is fixed to a piston $y^8$ therein, which piston is moved to close the valve by the air-pressure from the main reservoir through the pipe $b$, and is moved to open the valve by the steam-pressure under the latter, or by both this pressure and the action of a spring $z^7$, a duct $z^8$ being provided in the cylinder under its piston to permit free movement. To supply air to the cylinder $y^7$ only at the time when the desired limit of pressure is reached and then suddenly and at other times to leave it without pressure, my invention provides, preferably, another form of my improved pressure-governor valve, that in this instance comprising a cylinder A', into one side of which the pipe $b$ supplies reservoir-pressure constantly, while the other end of the cylinder is open to the outer air through a port B', which cylinder contains a piston C', resisted by a spring D' and carrying a rod E', having a duct F' from the pressure side of the piston toward its outer end, where it opens into an annular groove G' within the tubular sleeve H' surrounding the piston-rod, which rod has beyond this groove a cylindrical valve-face I', fitting the interior of the sleeve H' and preventing escape of pressure from the groove G', beyond which valve the piston-rod is sufficiently reduced to give space for an outlet-duct communicating with the outer air. Between the sleeve H' and the piston $y'$ is a port J'. The parts are so adjusted—as, for example, by screwing the piston-rod by means of its squared outer end in or out relatively to the piston—that when the reservoir-pressure in the cylinder A' is at the desired limit—say ninety pounds per square inch—the spring D' will hold the valve I' exactly over the port J', so that no communication exists through the latter, while as soon as this pressure exceeds this limit the further outward movement of the piston C' will move the valve past this port, so that there can be an instantaneous flow of pressure from the cylinder A' through the duct and port into the cylinder $y^7$, which will serve to immediately depress the piston $y^8$ and close the valve G, thus cutting off steam from the pump. The parts will remain in this position until the pressure falls below such limit, whereupon the spring D' will force the piston C' back until the valve I' opens the port J' to the air, which will permit an immediate escape of the pressure above the piston $y^7$, so that the latter can immediately rise with the valve $v^8$ to the open position. Thus the valve will pop from one to the other position, always being completely opened or closed, so that there will be no wire-drawing of the steam.

My invention also comprises improved means for preventing flow of condensation from the steam-pipe to the pump when the governor is closed. In its preferred form I provide an automatic condensation collector and discharger K', which opens to receive water of condensation from the steam-pipe when the steam-valve closes and shuts off communication with the steam-pipe, as well as opening to discharge the collected water as the steam-valve opens. This is preferably constructed as shown in Figs. 6, 10, and 11, wherein a stem L' from the steam-valve passes through a tubular opening M' in the shell N' of the valve and has a duct O', which when the steam-valve is closed opens communication through the shell, so that as water collects in the latter it can pass through the duct and outside of the shell, while when the steam-valve is open the duct is above and closes communication through the opening M'. Surrounding this opening is a collecting vessel P', which has an opening Q', through which travels the valve-stem R', having a duct S', which when the steam-valve is in the closed position prevents escape from the collector P'; but as the steam-valve, and likewise the valve O', rise the stem R' rises also, and then its duct opens communication between the inside of the vessel P' and the outer air of the receiver for the water of condensation, whereupon this water can escape, air being simultaneously admitted to the vessel through a duct T', which is opened by the depression of a valve U' against its spring V' as the steam-valve raises this valve U' against the seat X' to preclude the possibility of the escape of any steam into the separator while the steam-valve is open. A cupped washer W' makes a packing around the stem R' when the steam-valve is closed. The spring V' closes the duct T' as soon as the valve U' is released from its seat by at once raising this valve across the duct. In this way the water of condensation will drain into the vessel P' while steam is shut off from the pump, so that when steam is admitted to the latter there will be no such water to interfere with the operation of the pump, and the accumulated water in the vessel P' will be drawn off automatically after each opening of the governor-valve.

It will be seen that my invention provides various improvements applicable to fluid-pressure-brake systems and to other apparatus which can be readily and advantageously employed, and it will be understood that the invention is not limited to the particular details of construction, arrangement, and combination set forth and shown as constituting its preferred adaptation, but that it can be adopted in whole or in part, according to such modifications as circumstances or the judgment of those skilled in the art may dictate, and may be used in whole or in part in connection with any desired devices without departing from the spirit of the invention.

In case of direct application of the brakes by means of the direct exhaust-port $t$, which is done when the equalizing discharge-valve $e$ is useless for any cause, as in case of leakage, when its outlet should be plugged, thus converting the engineer's valve into substantially the old three-way cock or direct-application valve. My invention provides for convenient manipulation of the handle for such application and for indicating the conditions of train-pipe pressure during such application. I provide a second lap position for the valve beyond the ordinary application position, which is indicated in Fig. 4 as "second lap," and a direct-application position between this lap and the emergency position through which the handle can be swung to make direct applications. The position of second lap begins when the end of the port $u^8$ passes out of communication with the port $t^8$ and extends from this position to the position in which the edge of the port $r^8$ in the valve meets the reduced edge of the direct-exhaust port $t$. My invention provides for indicating the pressure in such applications, a port $u^9$ in the valve-seat leading to the equalizing-chamber $d$, and a reciprocal port $r^9$ leading from the port $r$ of the valve $i$, the ports $u^9$ and $r^9$ being dead ports—that is, being out of communication or coincidence with each other—at all positions of the valve except while the valve is on the second lap or between the beginning of the second-lap position and the full-emergency position, during all of which time the ports are in communication, so that the train-pipe pressure and equalizing or or small-reservoir pressure can equalize, and the small-reservoir gage-hand can indicate train-pipe pressure as it varies with such direct applications, and while the valve is on the second lap, which can be called the "direct-application" lap. Thus the engineer is guided by his gage as well in direct-application braking as in ordinary service or equalizing-discharge braking.

It will be seen that by my invention the life and efficiency of the engineer's valve are increased, its construction and manipulation are simplified, and that small feeding-ports tending to wire-draw the feed to the train-pipe are avoided. It will also be seen that all the feedways between the main reservoir and train-pipe system will either be open to their maximum extent or fully closed, so that no matter how frequent the applications the pressure in the train-pipe can be immediately restored by a full flow from the main reservoir at once upon the return of the valve-handle to the release position. This is of great importance where frequent stops are made or where frequent braking on a long downgrade is desirable, as in either case it is necessary with former excess valves to wire-draw the pressure through the excess-valve through a contracted valve-orifice against the resistance of a twenty-pound spring or else to endanger the train-pipe with full main-reservoir pressure by leaving the engineer's valve at the old full-release position, in which there is no protection for the train-pipe against such pressure. It will also be seen that any desired differential of pressures can be used between the main reservoir and train-pipe, so that for emergencies like those mentioned the main-reservoir pressure may be raised to, say, one hundred and thirty or one hundred and fifty pounds per square inch, while the safety-valves will automatically cut off train-pipe communication as soon as the seventy-pound pressure in the pipe is reached, without regard to the main-reservoir pressure. Generally in former excess-valves the train-pipe pressure could only be maintained at the difference below reservoir-pressure to which the excess-valve was set. If the resistance to this valve equaled twenty pounds, the train-pipe pressure would be twenty pounds less than main-reservoir pressure, no matter what limit the latter was raised to, so that if this pressure were carried at one hundred and thirty pounds for special purposes the normal operation would permit train-pipe pressure to raise to one hundred and ten pounds before the excess-valve would cut it off.

It will be understood that the proportions and dimensions of the various structural details pertaining to the improvements incident to my invention are to be varied or adjusted to suit the conditions existing in particular cases, and that the proportions shown and conditions herein set forth are merely taken as examples for illustrating the operation and utility of the various features of improvement.

What I claim is, in fluid-pressure brakes and other apparatus, the following-defined novel features and combinations, substantially as and for the purposes hereinbefore set forth, namely—

1. In air-brakes and other pressure apparatus, the combination with a source of fluid-pressure, means for utilizing such pressure, a pipe communicating between said parts and a valve controlling such communication, of a pressure-regulator in communication with said pipe beyond said valve and automatically preventing flow of pressure to said means exceeding a predetermined limit, and a valve operated by said regulator, having fully-open and fully-closed positions and popping from one position to the other without intermediate rest.

2. In air-brakes and like apparatus, the combination with a brake-cylinder and a pipe supplying fluid-pressure thereto, of an inlet-valve operated by the pressure in said cylinder and automatically preventing flow of pressure thereto at a predetermined limit of pressure therein, and means preventing operation of said valve prior to such limit of pressure.

3. In air-brakes and analogous apparatus an auxiliary reservoir and a pipe supplying pressure thereto, in combination with an automatic inlet-valve operated by the pressure within said reservoir and automatically closed by such pressure and preventing flow of pressure thereto at a predetermined limit, and means closing such valve only when such limit of pressure is reached.

4. In air-brake and analogous apparatus, the combination with an engineer's valve and a main reservoir, of a quick-acting pop-valve at the main reservoir side of and automatically and completely closing flow of pressure to said engineer's valve when the pressure therein reaches a predetermined limit, and means operated by the pressure beyond said engineer's valve and controlling operation of said pop-valve.

5. In air-brake and analogous apparatus, an engineer's valve, a main reservoir supplying pressure thereto, and a train-pipe receiving pressure therefrom, in combination with a quick-acting pop-valve at the main-reservoir side of said engineer's valve automatically operated by the pressure in said train-pipe and completely isolating the latter from said reservoir when the pressure in the train-pipe reaches a predetermined limit, and preserving the maximum communication between said reservoir and pipe until such limit is reached.

6. For fluid-pressure brakes and other devices, the combination with a pressure-operated valve, of the improved valve-operator comprising a pressure-receiving cylinder and a piston therein, the one movable relatively to the other, means supplying pressure from one side of said pressure-operated valve to said cylinder at one side of said piston and a pressure-outlet therefrom at the other side thereof, means resisting relative movement of said parts, and a valve and valve-port operated by such relative movement for supplying pressure to the pressure-operated valve to be operated at a predetermined point in such movement.

7. For fluid-pressure brakes and other devices, the combination with a pressure-operated valve, of the improved valve-operator comprising a cylinder and a movable piston therein, a pressure-inlet for said cylinder at one side of said piston, a pressure-outlet therefor opening to the atmosphere at the other side of said piston, a spring resisting movement of said piston, and a fluid-pressure-controlled valve controlling flow of pressure to the pressure-operated valve to be operated and opened at a predetermined position of said piston.

8. For fluid-pressure brakes and other apparatus, means for operating valves by pressure consisting of a cylinder having a port intermediate of its ends, and pressure inlet and outlet ducts beyond said port, a piston within said cylinder between said ducts and crossing said port, and a spring resisting movement of said piston, and adjustable to determine the limit of pressure at which said piston shall cross said port, said piston moving past said port and opening it to the pressure in said cylinder when the predetermined limit of pressure therein is exceeded, whereby pressure can then flow through said port to the point of use, and said spring moving said piston to the other side of said port when the pressure falls below the predetermined limit, whereby said port is open and said pressure can escape therethrough to the outlet from said cylinder.

9. In valves for fluid-pressure brakes and other purposes, a pressure-conductor and a valve controlling communication therethrough, in combination with a piston connected to and operating said valve, and automatic pressure-operated means normally permitting said piston to occupy a position in which said valve is open, and upon predetermined conditions suddenly permitting a flow of pressure against said piston and causing it to quickly seat said valve.

10. For fluid-pressure brakes and other apparatus, a pressure-conductor, in combination with a valve controlling flow thereto comprising a seat and a valve proper movable against and from such seat, and means closing said valve proper operated automatically by the pressure at the egress side thereof when a predetermined limit of pressure is attained, and means opening said valve proper operated by the pressure at the ingress side thereof when such pressure falls below said limit.

11. For fluid-pressure brakes and other devices a conductor for fluid-pressure having a valve-seat and a valve proper controlling communication past said seat, in combination with a piston operating said valve proper, a cylinder for said piston, means automatically supplying pressure within said cylinder for operating said piston, and an automatic relief-valve controlling escape of such pressure and controlled by the pressure at the ingress side of said valve proper.

12. For fluid-pressure brakes and other apparatus, the combination with a cylinder and means for supplying pressure thereto of a valve controlling ingress to said cylinder automatically closed by the pressure therein at its egress side and automatically controlled by the pressure at its ingress side and means controlling operation of said valve at predetermined differences of pressure in said cylinder and its supplying means.

13. For fluid-pressure brakes and other apparatus a valve K having valve proper $w$, cylinder $w'$, piston $w''$, cylinder N, piston O, cylinder Q, piston R, ducts $y''$ and $z''$, ports $a'$ $a''$ and vent $z$, substantially as and for the purpose set forth.

14. For fluid-pressure brakes and other apparatus, a vessel for compressed fluid and a fluid-conductor leading thereto in combination with a valve controlling flow of pressure to said vessel, closed by the pressure therein, automatically closing at a predetermined limit of pressure therein and free to open when the pressure therein exceeds that at the ingress side of said valve and means keeping said valve closed while the pressure in said vessel and conductor exceeds such limit, and permitting it to open when the pressure in said conductor is less than said limit.

15. For fluid-pressure brakes and other apparatus, the combination with an auxiliary reservoir and a distributing-valve therefor of a valve between said parts automatically closing and arresting flow to said reservoir at a predetermined limit of pressure therein and free to unresistingly open and release pressure therefrom when the pressure at its outer side is below that in said reservoir.

16. For fluid-pressure brakes and other apparatus, a fluid-pressure conductor having a valve-seat and a valve proper closing on said seat and controlling communication through it, in combination with a piston operating said valve proper, a cylinder for said piston, a second cylinder receiving pressure from the egress side of said valve proper, a port leading from the latter cylinder to the former cylinder at one side of its piston, a similar port leading to the other side of such piston, a port leading from the ingress side of said valve proper to said second cylinder a piston in the latter and a valve therein controlling flow of pressure to said first cylinder and when in one position supplying pressure to one side thereof and relieving it from the other side thereof and when in the other position reversing the supply of pressure to said cylinder.

17. For fluid-pressure brakes and other apparatus, a valve L having a seat and valve proper and means automatically operating the latter comprising a cylinder, a piston therein, ducts leading to said cylinder at opposite sides of said piston and an automatically-operated valve supplying pressure to one side or the other of said piston at predetermined limits of pressure on the respective sides of said valve proper.

18. For fluid-pressure brakes and other apparatus, a valve L comprising a casing having a valve-seat, a cylinder $d''$, a valve-seat, a cylinder T, ducts $e''$, $g''$ and $g'$, vent $f''$, a valve proper, a piston $d'$ operating the latter and in said cylinder $d''$, and a piston U in said cylinder T operated by the pressure therein, and controlling flow to said cylinder $d''$ to determine the position of the piston $d'$ therein and open or close said valve proper.

19. For fluid-pressure brakes and other devices, a valve proper, a piston operating it, a cylinder for said piston, and a port leading thereto, in combination with a second cylinder, a piston therein, a pressure-inlet for said cylinder at one side of said piston, a tubular sleeve at the other side thereof intersecting said port, a piston-rod for said piston working in said sleeve, having a duct leading from the pressure side of said piston and a valve fitting said sleeve beyond said duct, and having a duct at the other side of said valve leading to the outer air, said piston and stem moving with the pressure in said cylinder and when in one position opening said port and permitting a flow of pressures from said second cylinder to said first cylinder and when in the other position preventing such flow and permitting escape of pressure from said first cylinder through said port and sleeve to the exterior.

20. For fluid-pressure brakes and other devices, a pressure-operated valve in combination with means for controlling the supply of pressure to the same comprising a cylinder A', a piston C' therein, a stem E' for such piston, a duct F' therethrough, a valve G' moving with said stem, and a port J' opposite said valve, substantially as and for the purpose set forth.

21. An engineer's valve for fluid-pressure brakes having feed train-pipe, small reservoir, and direct exhaust-ports, in combination with a rotary valve proper having reciprocal ports, said valve and valve proper having lap-service application and emergency positions, and having between the latter second lap and direct-application positions, and having reciprocal ports, the one communicating with the small reservoir and the other with the train-pipe, communicating with each other at the second lap and direct-application positions, whereby during direct application the small reservoir pressure-gage can be used to show train-pipe pressure.

In witness whereof I have hereunto signed my name in the presence of two subscribing witnesses.

JAMES N. WEIKLY.

Witnesses:
GEORGE H. FRASER,
THOMAS F. WALLACE.